(12) United States Patent
Grzesiak et al.

(10) Patent No.: US 7,066,305 B2
(45) Date of Patent: Jun. 27, 2006

(54) BRAKE BANDS FOR AN AUTOMATIC TRANSMISSION AND METHOD FOR CONTROLLING A GEAR SHIFT IN AUTOMATIC TRANSMISSION AND FEEDBACK LOOP CONTROL SYSTEM

(75) Inventors: Anthony J. Grzesiak, Sauk Village, IL (US); Chris Denault, St. Anne, IL (US); Thomas G. Brand, Northville, MI (US); Darren L. Firth, Parramatta (AU); Richard T. Tamba, Castle Hill (AU)

(73) Assignee: BorgWarner Inc., Auburn Hills, MI (US)

( * ) Notice: Subject to any disclaimer, the term of this patent is extended or adjusted under 35 U.S.C. 154(b) by 512 days.

(21) Appl. No.: 10/016,472

(22) Filed: Dec. 10, 2001

(65) Prior Publication Data

US 2002/0121410 A1    Sep. 5, 2002

Related U.S. Application Data

(60) Provisional application No. 60/254,476, filed on Dec. 8, 2000.

(51) Int. Cl.
*F16D 55/18* (2006.01)
*B60T 11/00* (2006.01)

(52) U.S. Cl. .................. 188/77 W; 188/72.4; 188/347; 475/118

(58) Field of Classification Search .............. 188/77 R, 188/77 W, 72.4, 72.5, 151 R, 259, 347, 348; 475/116, 118, 120, 127
See application file for complete search history.

(56) References Cited

U.S. PATENT DOCUMENTS 2,409,506 A * 10/1946 McFarland .................. 475/123
2,513,192 A *  6/1950 McFarland ............... 188/151 R
3,004,390 A * 10/1961 Duffy ............................ 91/27
3,103,991 A *  9/1963 Flinn ......................... 188/77 R
4,070,981 A *  1/1978 Guinn et al. ................. 114/293
4,360,092 A * 11/1982 Muller et al. .............. 192/12 C
4,388,986 A *  6/1983 Umezawa ................. 188/77 R
4,930,373 A *  6/1990 Nakawaki et al. ........... 475/128
5,003,842 A *  4/1991 Hatta et al. .................. 477/154
5,445,246 A *  8/1995 Haka et al. ................ 188/77 R
5,588,928 A * 12/1996 Koivunen .................... 475/126
5,711,403 A *  1/1998 Sparks et al. ............. 188/77 W (Continued)

FOREIGN PATENT DOCUMENTS

JP         3194249 A  *  8/1991

(Continued)

*Primary Examiner*—Melody M. Burch
(74) *Attorney, Agent, or Firm*—Warn, Hoffmann, Miller & LaLone, P.C.; Greg Dziegielewski (57) ABSTRACT

A brake band shifting mechanism for an automatic transmission. The brake band shifting mechanism includes a brake band encircling a brake drum of the transmission. A first end of the brake band is mounted to a secured portion of the transmission by a first linkage and a second end of the brake band is mounted to a two-stage servo by a second linkage. The servo provides selective apply and release pressure to the second linkage to control the compression or expansion of the brake band. In operation, the brake band is quickly compressed to the brake drum during the first stage of the servo, and then fine adjustments are made to control the speed of the brake drum during the second stage of the servo, where inputs from position and speed sensors in the transmission are used to control the adjustment of the brake band.

18 Claims, 7 Drawing Sheets

U.S. PATENT DOCUMENTS

| | | | |
|---|---|---|---|
| 5,752,588 A * | 5/1998 | Reichert et al. | 188/77 R |
| 5,881,858 A * | 3/1999 | Tsukamoto et al. | 192/86 |
| 6,053,834 A * | 4/2000 | Savoyard et al. | 475/145 |
| 6,074,319 A * | 6/2000 | Sato et al. | 475/120 |
| 6,102,825 A * | 8/2000 | Hisano et al. | 475/118 |
| 6,110,068 A * | 8/2000 | Kraska | 475/146 |
| 6,220,402 B1 * | 4/2001 | Tsutsui et al. | 188/77 W |
| 6,260,671 B1 * | 7/2001 | Fujita | 188/77 W |
| 6,422,356 B1 * | 7/2002 | Suzuki et al. | 188/77 R |

FOREIGN PATENT DOCUMENTS

JP           11264460 A * 9/1999

* cited by examiner

BRAKE BANDS FOR AN AUTOMATIC TRANSMISSION AND METHOD FOR CONTROLLING A GEAR SHIFT IN AUTOMATIC TRANSMISSION AND FEEDBACK LOOP CONTROL SYSTEM

CROSS-REFERENCE TO RELATED APPLICATIONS

This application claims the benefit of U.S. Provisional Application Ser. No. 60/254,476, titled "Brake Bands for an Automatic Transmission and Method for Controlling a Gear Shift in Automatic Transmission and Feedback Loop Control System," filed Dec. 8, 2000.

BACKGROUND OF THE INVENTION

1. Field of the Invention

The present invention relates generally to a brake band for an automatic transmission and, more particularly, to a brake band for an automatic transmission that employs a two-stage solenoid for providing an initial fast apply pressure to the band and then a PID controlled apply pressure to the band based on measurements of the brake drum speed and band loading.

2. Discussion of the Related Art

Automatic transmissions used in modern passenger vehicles typically employ both band shifting mechanisms and friction disk or clutch pack shifting mechanisms. The relatively simple hydraulic control systems that were used at the time automatic transmissions were originally designed made the choice between band shifting mechanisms and clutch packs dependent upon packaging, to a great degree. More modern designs, however, have employed more sophisticated control strategies. Band shifting mechanisms have typically been avoided in these newer designs because of concerns with band response time and variability as compared to clutch pack shifting mechanisms. Band shifting mechanisms do, however, have advantages of durability and spin loss over clutch pack shifting mechanisms.

The environment that a band shifting mechanism operates in is not as controlled as a clutch pack shifting mechanism environment. Lubrication variation, actuation fluid volume, and system stretch are variables that cannot easily be handled with mapped responses in band systems. It has, therefore, been a goal in the art to allow transmission designers the same packaging flexibility previously seen in legacy transmissions without compromise of modern controls or customer satisfaction.

U.S. Pat. No. 6,110,068 discloses a synchronized shifting technique that employs two separate friction elements for use in a brake band or friction disk transmission. The friction elements are monitored during the shift and adjusted to provide an improved gear ratio shift. While such a technique may provide improved transmission shifts, it lacks certain characteristics that allow precise control of the band during the shift. A more precise control of the brake band would provide an even smoother and more desirable shift of the transmission.

SUMMARY OF THE INVENTION

In accordance with the teachings of the present invention, a brake band shifting mechanism and associated method is disclosed for providing an improved automatic transmission shift control. The brake band mechanism employs a two-stage hydraulic servo that is operatively coupled to an actuatable linkage to positively compress and expand the brake band wrapped around a brake drum of the transmission. During the first stage, the servo applies a fast-acting compression force to the brake band to move the band to a first predetermined position where the band first comes in contact with the brake drum. During the second stage, a closed loop control is used to apply positive pressure in both the apply and release directions of the band to control the speed of the drum during the shift based on predetermined shift parameters. The shift parameters are based on predetermined inputs, such as drum speed and position and band strain. The invention monitors the actual shift parameters during the shift in order to produce a smoother shift than those brake band shift mechanisms known in the art.

The servo includes a fast acting piston that positions the band under a first predetermined position and, thereafter, applies a ramp-up pressure and a ramp-down pressure on the band that provides a smooth feeling shift of the transmission. This allows the brake band mechanism of the present invention to operate more smoothly and alleviate drawbacks associated with known band-type shifting. The positive connection of the linkage allows the band to be modulated, particularly in the critical region of drum arrest. Further, the positive connection allows a design degree of freedom not seen with friction disks. Also, separation of the band from the drum can be optimized for spin loss characteristics.

A further understanding of the present invention will be had in view of the description of the drawings and detailed description of the invention, when viewed in conjunction with the subjoined claims.

DETAILED DESCRIPTION OF THE EMBODIMENTS

The following discussion of the invention directed to a brake band shift mechanism for an automatic transmission is merely exemplary in nature and is in no way intended to limit the invention or its applications or uses.

Figure 1:
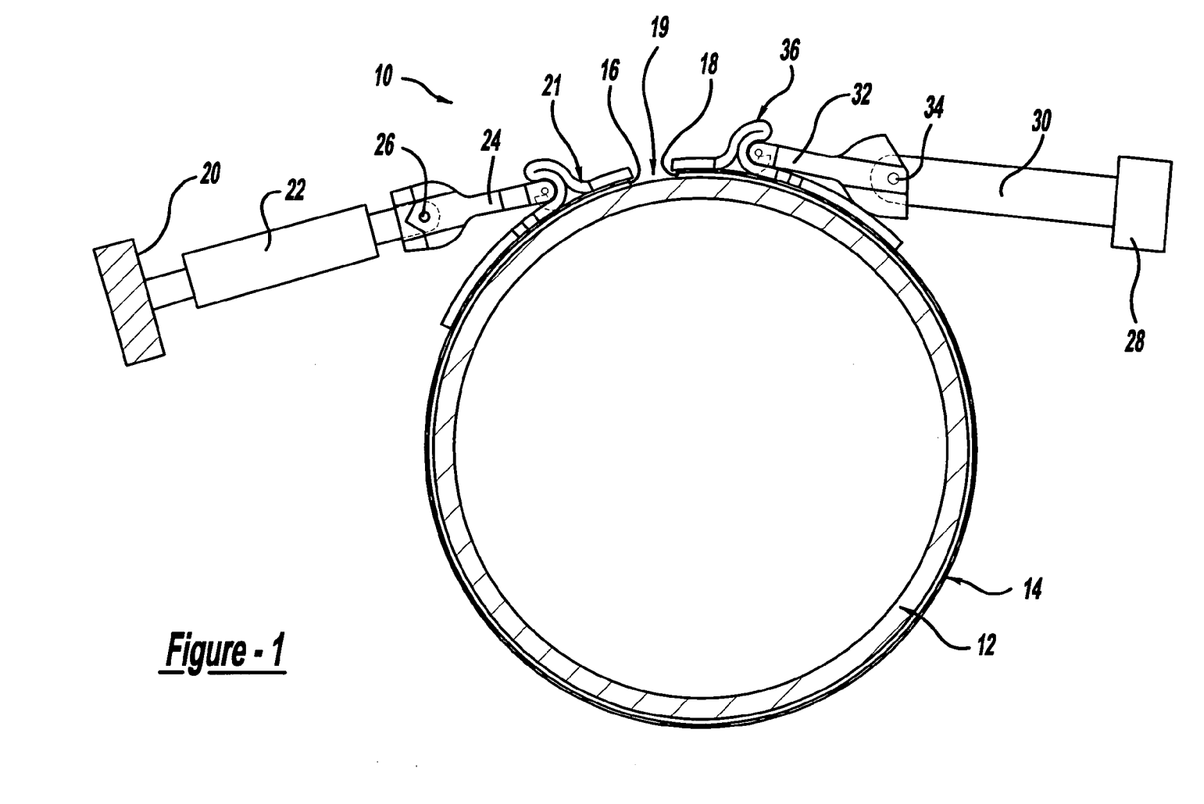
FIG. 1 is a side view of a brake band mechanism associated with an automatic transmission, according to an embodiment of the present invention.

FIG. 1 is a side, cross-sectional view of a brake band shift mechanism 10 for use in an automatic transmission of a vehicle. A brake drum 12 of the transmission is shown in cross-section, and would be one of a plurality of such brake drums, as would be readily understood in the art. As is also well understood in the art, the brake band shift mechanism 10 would be one of a plurality of brake band shift mechanisms and/or clutch packs associated with the transmission of the vehicle to provide automatic shifting.

The brake band mechanism 10 includes a brake band 14 wrapped around the drum 12, as shown. The band 14 includes opposing ends 16 and 18 defining a gap 19 therebetween. As is well understood in the art, the brake band 14 expands and contracts around the drum 12 to allow or prevent the drum 12 from rotating and to control the speed of rotation of the drum 12.

According to the invention, the end 16 of the band 14 is coupled to a clip structure 21, discussed in detail below. An attaching member 24 is coupled to the clip structure 21, and is pivotally attached to a link arm 22 by a pivot pin 26. The link arm 22 is mounted to a secured portion 20 of the transmission opposite to the member 24. The pivot pin 26 allows proper actuation and pivoting of the band 14 relative to the drum 12 during expansion and compression of the band 14. The end 18 of the band 14 is also coupled to a clip structure 36 identical to the clip structure 21. An attaching member 32 is coupled to the clip structure 36, and is pivotally attached to a link arm 30 by a pivot pin 34. According to the invention, the link arm 30 is mounted to a two-stage servo 28, discussed in detail below, of the transmission opposite to the member 32. The pivot pin 34 also allows proper actuation and pivoting of the band 14 relative to the drum 12 during expansion and compression of the band 14. It is to be readily appreciated that while the link arms 22 and 30 are disclosed as a particular concept, other suitable attachment mechanisms can be employed within the scope of the present invention. The clip structures 21 and 36 act to positively connect the attaching members 24 and 32, respectively, to the secured portion 20 and the servo 28 so that positive band adjustments can be made in both the apply and release directions of the band 14.

Figure 2:
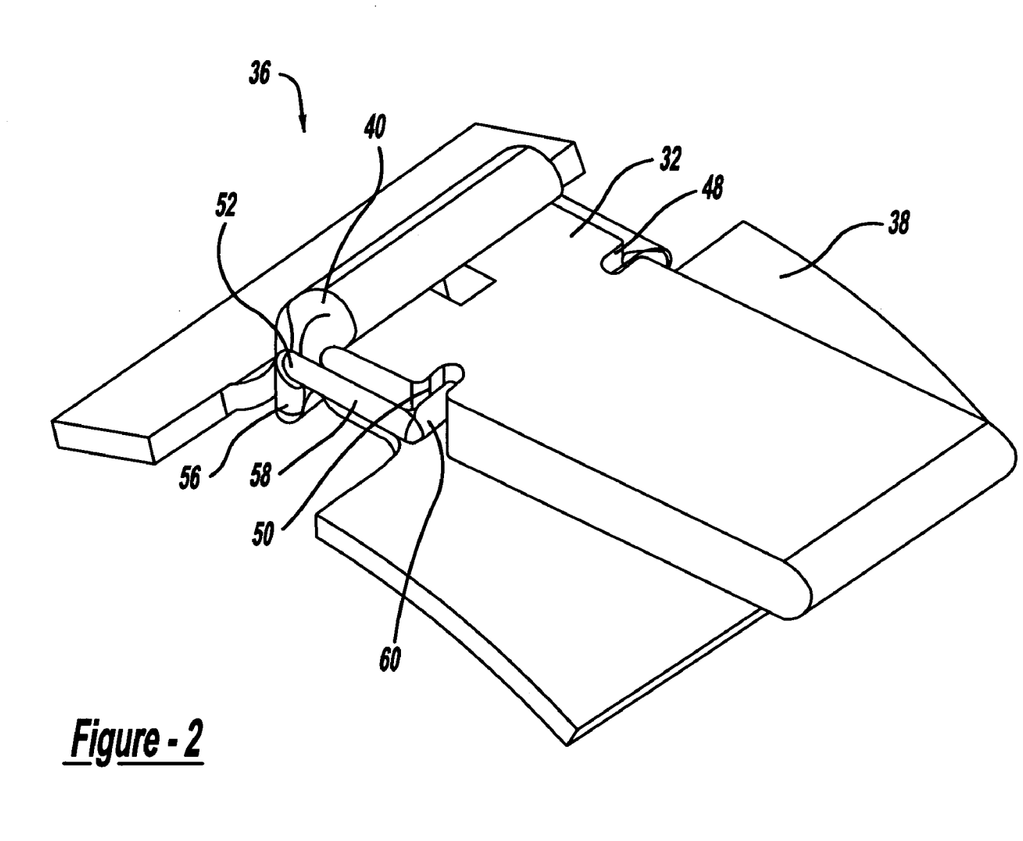
FIG. 2 is a perspective view of an attachment clip assembly positively attached to an apply member coupled to the brake band shown in FIG. 1.
Figure 3:
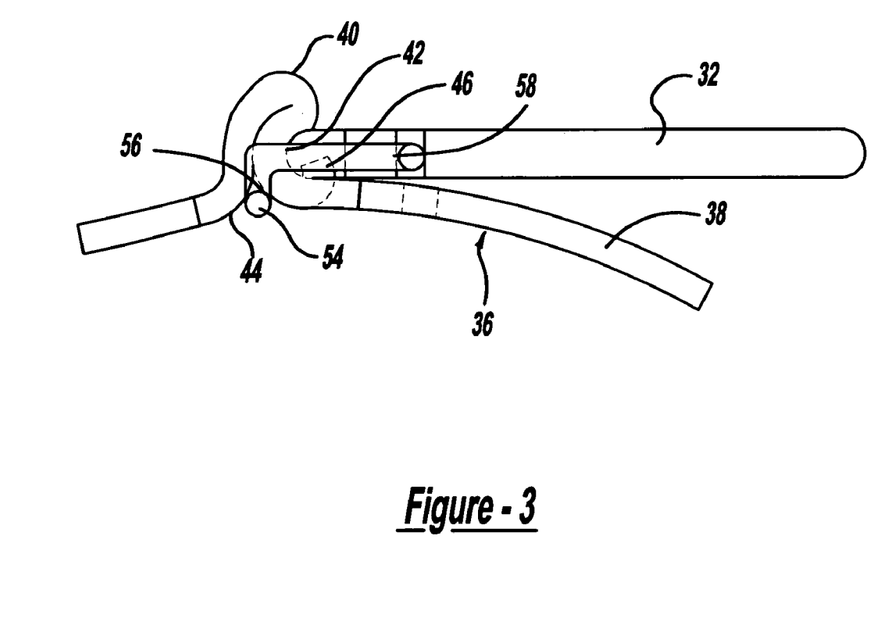
FIG. 3 is a side view (partially in phantom) of the clip shown in FIG. 2 of the present invention.

FIG. 2 is a perspective view and FIG. 3 is a side view of the clip structure 36 with the attaching member 32 mounted thereto, but separated from the mechanism 10. The clip structure 36 includes an attachment base member 38 having opposing detentes 48 and 50, and an overturned portion 40 defining a concave cavity 44 having an inside radius 42. An end of the member 32 is positioned against the overturned portion 40, as shown. Additionally, an upturned portion 46 is produced by a cut-out portion of the base member 38. A spring clip member 52 couples the arm 32 to the clip structure 36 to provide positive control of the band 14. The spring member 52 includes a lower peripheral member 54 that is positioned under the cavity 44, and includes an upturned leg 56, a horizontal leg 58 and engagement portions 60. The horizontal leg 58 and the engagement portions 60 provide positive engagement with the member 32 for apply and release pressure to the band 14. The base member 38 may be either formed directly from the band material itself, or may be brazed, riveted or otherwise attached to the brake band 14 and either end 16 or 18 thereof.

Figure 4:
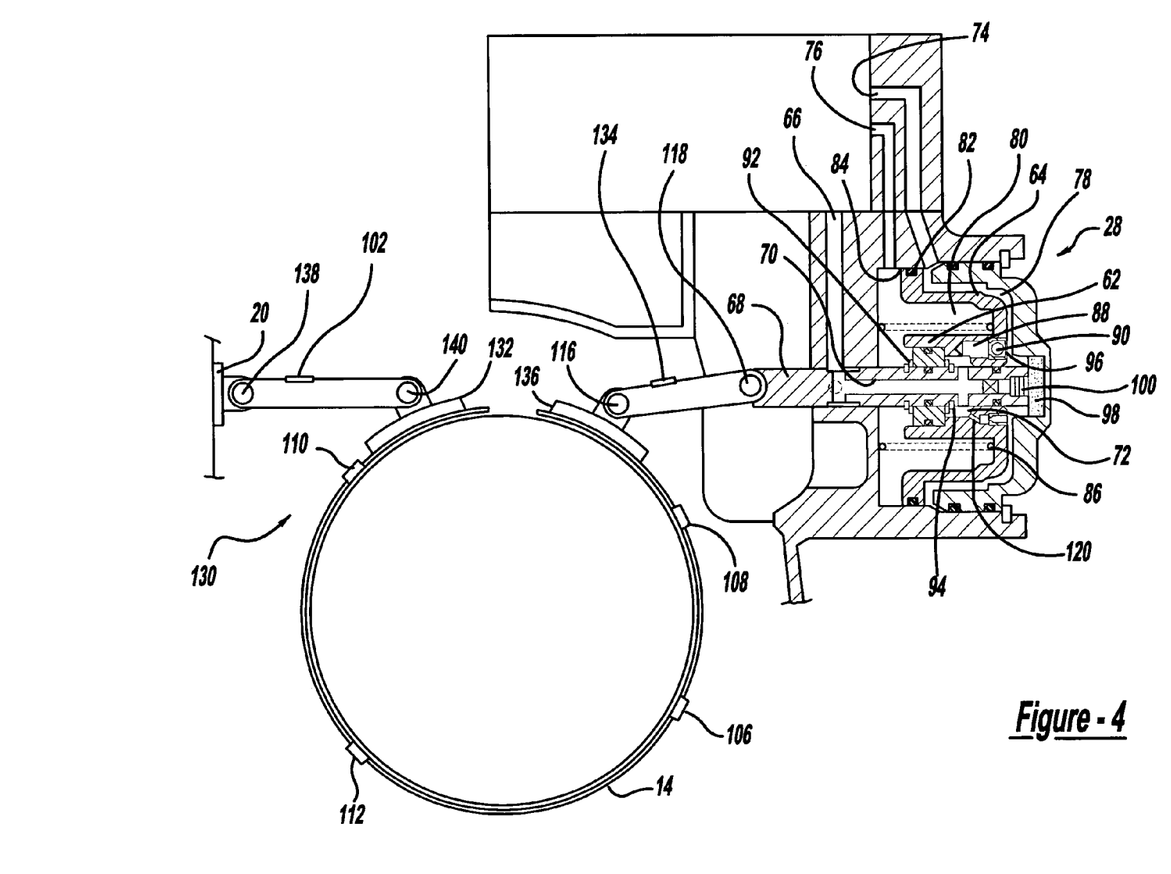
FIG. 4 is a side view of a two-stage servo in section showing a positive apply configuration of the brake band shown in FIG. 1.

FIG. 4 is a plan view of a brake band shifting mechanism 130, according to another embodiment of the invention, that includes the servo 28 of the invention shown in cross-section. In this embodiment, the mechanism 130 includes an attachment arm 102 pivotally coupled to the portion 20 by a pivot pin 138 and pivotally coupled to a clip structure 132 by a pivot pin 140. Further, the mechanism 130 includes an attachment arm 134 pivotally coupled to the servo 28 by a pivot pin 118 and pivotally coupled to a clip structure 136 by a pivot pin 116.

The servo 28 includes a first rapid apply piston 62 and a second, larger apply piston 64 for more finite adjustments and control of the band pressure. The rapid apply piston 62 is actuated through a rapid apply/release channel 66, which goes through an actuator arm 68 by way of an internal cavity 70 to fill a rapid apply chamber 72. A hydraulic apply channel 74 fills a chamber 78 for finite control of the apply piston 64, and a hydraulic release channel 76 allows rapid release of the piston 62, when required, for releasing hydraulic fluid from a chamber 80.

The piston 64 includes a seal 82 for sealing movement along an outer peripheral wall 84. A spring member 86 biases the piston 64 towards a return to the release position. A chamber 88 connects the apply piston 64 with the rapid apply chamber 72 via a ball-type check valve 90. Filling the chamber 72 pushes the piston 62 down by way of retainer rings 92 and 94 and actuates the actuator arm 68. Upon filling of the chamber 72, the pressurization of the check ball seals an opening 96, and thereafter the pressure from the rapid apply system goes into the apply chamber 78 in the large piston 64. Thus, the chamber 72 is sealed off after rapid apply takes place, and the apply pressure then goes to the larger chamber 78 for actuation of the larger piston 64 to control the band pressure. After pressure release, the check valve 90 allows drainage of fluid from both the rapid apply cylinder and the small apply cylinder.

An orifice 120 is provided which further facilitates the rapid apply function. As the piston 62 is applied it meets resistance when the arm 68 pushes against the band 14, and pressure is redirected to the chamber 78. Pressure then bleeds through the orifice 120 for equalizing the pressure between the chamber 72 and the chamber 78. This provides for a transition to the large chamber 72 and the piston 62 for closed loop control.

A position detector 98 senses the position of a magnet 100 to determine the position of the actuator arm 68. By knowing the position of the actuator arm 68, the mechanism controller knows the distance that servo applying the band 14 can be moved before the band contacts the drum 12. This allows for safe rapid fill during initial actuation, and controlled fill after contact on a real time basis rather than estimations made on previous shifts. Strut strain sensors 102 and 104 may also be provided for measuring the compression or release position of the band 14. Band strain sensors 106, 108, 110 and 112 may be provided to measure the strain on the band 14 for adjustment of the apply and release parameters, depending on the desired shift parameters. Therefore, the speed of the drum 12 can be determined for determining its synchronization relative to other transmission drums of the transmission.

Figure 5:
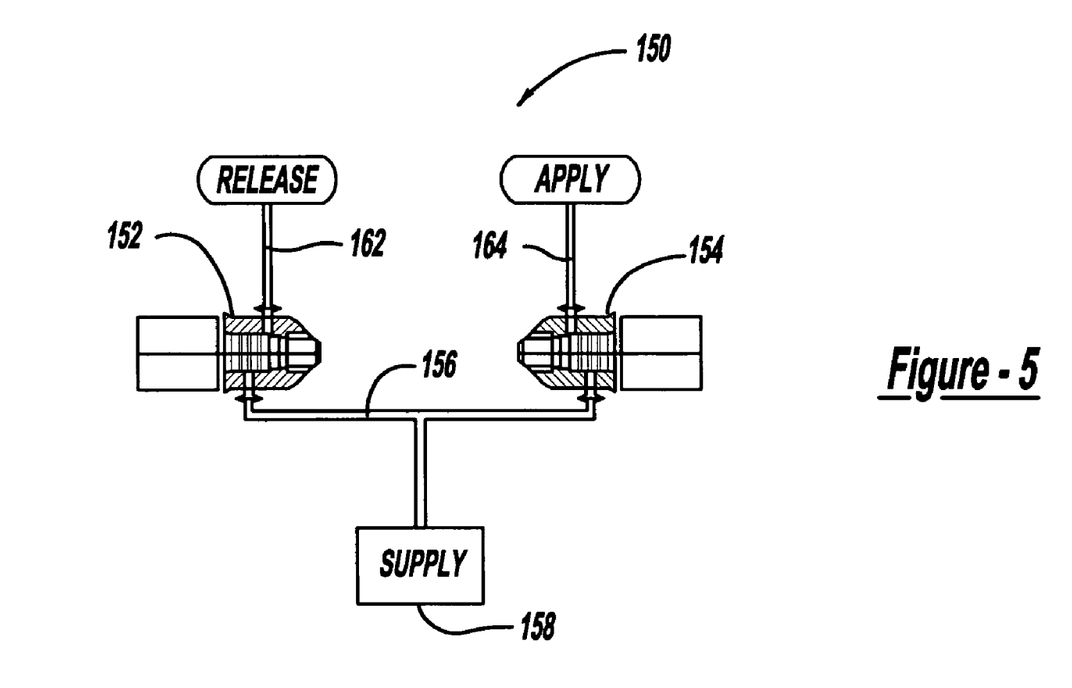
FIG. 5 is a hydraulic schematic view of a hydraulic circuit showing direct acting solenoids for use in connection with the brake band shifting mechanism of the present invention.

FIG. 5 is a hydraulic schematic 150 including a controlled flow direct acting solenoid 152 and a high-flow direct acting solenoid 154. The solenoids 152 and 154 are coupled through line 156 to a supply tank 158. The solenoid 152 is coupled through line 160 to the release channel 76. Likewise, the solenoid 154 provides the apply pressure on line 164 to the apply channel 74.

Figure 6:
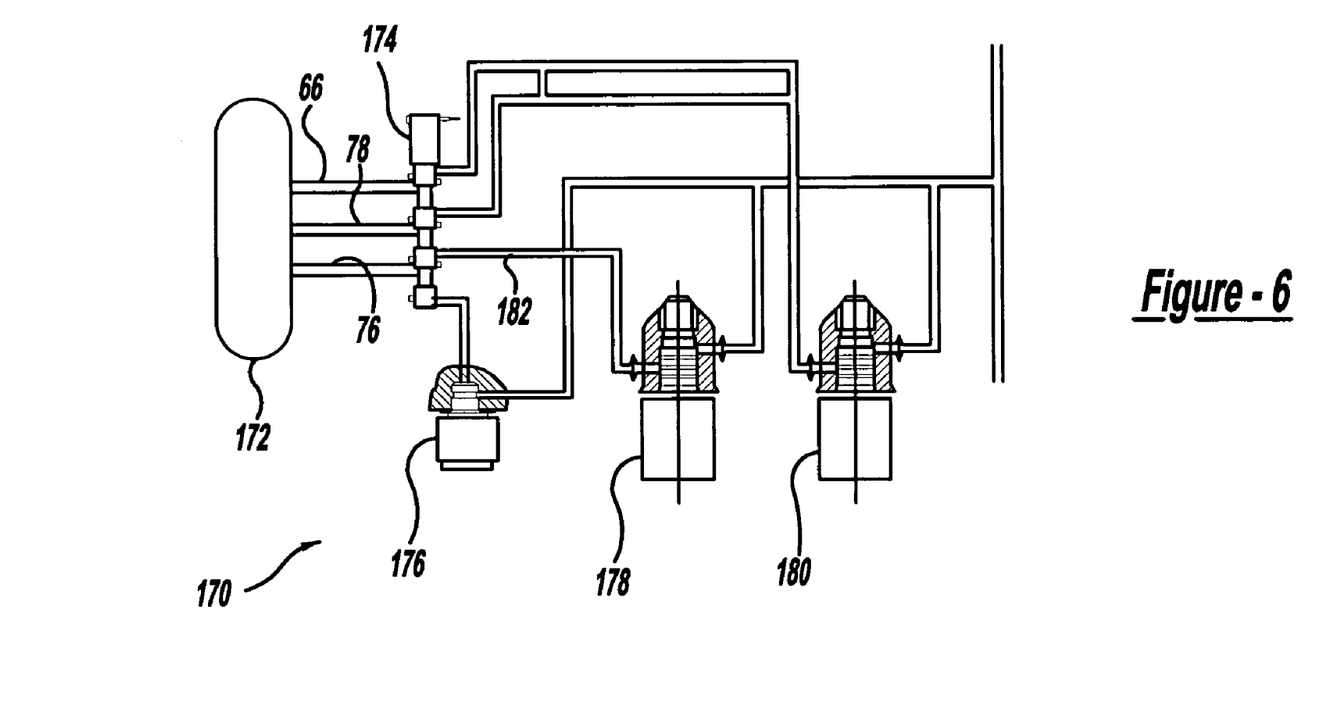
FIG. 6 is a hydraulic schematic view of a servo actuation system for use in connection with the brake band shifting mechanism of the present invention.

FIG. 6 is a more detailed hydraulic schematic 170 for use in connection with the band mechanisms 10 and 130, according to another embodiment of the present invention. The schematic 170 includes a servo 172 that is the same as the servo 28 discussed above. The schematic 170 includes the quick apply channel 66, the apply channel 74 and the release channel 76, as discussed above, coupled to a switch 174. A series of fluid lines 182 are connected to three solenoids 176, 178 and 180 that direct the hydraulic fluid through the channels 66, 74 and 76 to the servo 172 in the manner as discussed above.

Figure 7:
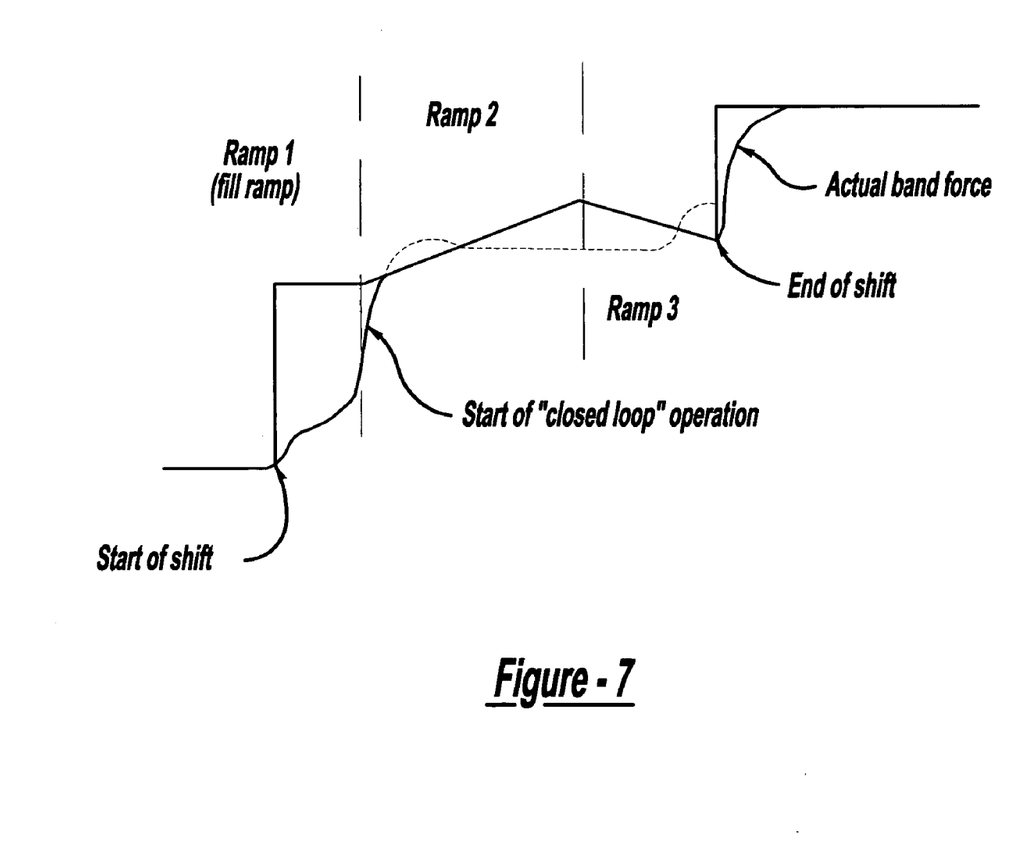
FIG. 7 is a graph showing a typical shift curve for the control system of the brake band shifting mechanism of the present invention.

Referring now to FIG. 7, a graph depicting a typical shift as set forth in the present invention is shown. At the beginning of the shift, shown as ramp 1, the rapid apply piston 62 of the servo 28 is filled with a predetermined pressure based on, for instance, servo rod position, derived engine torque or the like, as discussed herein. As will be readily appreciated, this fill pressure may be adjusted, based on servo rod positioning or the like. This allows reaching of initial fill pressure quickly, using the quick apply piston 62 to stroke in the shortest possible time. Thus, the rapid fill at the beginning of the shift shown by ramp 1 allows the servo 28 to quickly move the piston 62. Thus, the actuator 68 quickly expands the band 14 to a position where it first contacts the drum 12.

Typically, the servo rod position is used at the start of ramp 2, which starts closed loop operation mode of the band control. During ramp 2, the servo 28 is controlled by the various speed and position sensors associated with the transmission so that positive compression and expansion of the band 14 is tightly controlled to allow the drum 28 to be slowed at different rates over a predetermined time period during the shift. This allows the various other band elements and clutch pack elements associated with the transmission to be synchronized together during the shift. The shift control ramp 2 may be based on servo rod position, or another of the other measured inputs, or it can be time based. For example, the switch to closed loop control may be determined by a servo position sensor, apply strut strain sensors, servo pressure, band strains, engine RPM, transmission torque output, or combinations of these. During ramp 2, the load on the band will be controlled by using a Proportional-lntegral-Derivative (PID) control (closed loop) software. This allows the zero piston apply force to be modulated and any over stroke from ramp 1 to be corrected before the band torque is influenced.

Ramp 3 shows band control at the end of the shift, and may be based upon how much the shift has been completed (using speed signals) or may be time based or based on other parameters. During ramp 3, the load will continue to be controlled by the PID software. Ramp 3 may be used to modify the shift, via torque at the end of the shift. It will be readily appreciated that ramp 3 may be either positive or negative, depending on the desired shift parameters. Upon completion of the shift, i.e., at the end of the shift point the drum 12 stops rotating. At this point the band load is expected to rise such that it is controlled by the transmission line pressure or a default valve of the solenoid circuit. In other words, the positive apply pressure on the band 14 at the end of the shift is the pressure that holds the drum 12 until its respective gear is engaged.

It will be readily appreciated that when conditions are such that the band 14 must be released, the software will typically be used to reverse the above sequence. The rapid release of the piston 62 is accomplished at the chosen point towards the end of the shift. Down shift conditions are also controlled by the closed loop software. It will be appreciated that other variations and modifications for controlling shift may be used with the positive control of the band.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims and the appendix attached hereto.

What is claimed is:

1. A brake band mechanism for an automatic transmission having a brake drum, said mechanism comprising:
    a brake band encircling the brake drum, said brake band including opposing ends, said brake band operable to be compressed and expanded around the brake drum;
    a two-stage hydraulic servo; and
    a linkage coupled to said servo and said brake band, said servo activating said linkage to provide positive compression and expansion to said brake band for applying friction to the brake drum to control the speed of rotation of said brake drum;
    wherein said servo provides a rapid activation of said linkage during a first stage to rapidly expand said brake band, and a controlled compression and expansion of said brake band during a second stage.

2. The mechanism according to claim 1 further comprising a position sensor, said position sensor sensing the position of a piston of said servo.

3. The mechanism according to claim 1 further comprising at least one linkage sensor, said at least one linkage sensor sensing the position of said linkage.

4. The mechanism according to claim 1 further comprising at least one band strain sensor, said at least one band strain sensor measuring the strain on said brake band.

5. The mechanism according to claim 1 wherein said servo includes a first piston and a second piston, said first piston being smaller than said second piston, said first piston being operable to provide rapid movement of said brake band and said second piston being operable to provide fine adjustments of said brake band.

6. The mechanism according to claim 1 further comprising a clip structure, said clip structure being mounted to at least one of the opposing ends of said brake band and being coupled to said linkage.

7. A brake band mechanism for an automatic transmission having a brake drum, said mechanism comprising:
    a brake band encircling the brake drum, said brake band including opposing ends, said brake band operable to be compressed and expanded around the brake drum;
    a linkage coupled to said brake band;
    a two-stage hydraulic servo, said linkage coupled to said servo, said servo including a servo rod position sensor for determining a position of a stroke rod of said servo, said servo providing a rapid activation of the linkage during a first stage to rapidly expand said brake band, and a controlled compression and expansion of said brake band during a second stage; and
    a clip structure, said clip structure being mounted to an end of said brake band and being coupled to said linkage, said servo activating said linkage to provide positive compression and expansion to said brake band for applying friction to the brake drum to control the speed of rotation of said brake drum;
    wherein said servo includes a first piston and a second piston, said first piston being smaller than said second piston, said first piston being operable to provide rapid movement of said brake band and said second piston being operable to provide fine adjustments of said brake band.

8. The mechanism according to claim 7 further comprising at least one linkage sensor, said at least one linkage sensor sensing the position of said linkage.

9. The mechanism according to claim 7 further comprising at least one band strain sensor, said at least one band strain sensor measuring the strain on said brake band.

10. A method of controlling a shift of an automatic transmission comprising:
- providing a brake band for engaging a brake drum of an automatic transmission, said brake band being positively controlled for both apply and release pressure around said brake drum;
- applying a first fast active compression force to said brake band to a predetermined position; and
- providing a closed loop control of pressure on said brake band in both positive apply and release directions for controlling shift parameters of the transmission, based on a predetermined input;
- wherein a two-stage servo is used for controlling said brake band;
- wherein said servo has a first stage for rapidly applying band pressure, and a second stage for providing positive finite control of both apply and release pressures on said brake band during the shift.

11. The method of claim 10 wherein said shift parameters are selected from the group consisting of servo position, apply strut strain, servo pressure, band strain, engine RPM, transmission torque output, and combinations thereof.

12. The method of claim 10 further comprising a closed loop software control system controlling an apply solenoid.

13. The method of claim 10 wherein said method comprises controlling said shift by first ramping up the pressure at the beginning of said shift and releasing pressure toward the end of said shift.

14. The method of claim 13 wherein said brake band is locked in an applied position after the completion of said shift.

15. The method of claim 13 wherein a switch between ramping up and closed loop control is determined by inputs selected from the group consisting of servo position, apply strut strain, servo pressure, band strain, engine RPM, transmission torque output, and combinations thereof.

16. The method of claim 13 wherein both apply and release pressures are independently controlled.

17. The method of claim 16 wherein solenoids are used to independently control the apply and release hydraulic pressure.

18. The method of claim 10 wherein said first stage is a smaller volume piston than said second stage.

* * * * *